United States Patent
Leroy et al.

(10) Patent No.: US 11,945,297 B2
(45) Date of Patent: Apr. 2, 2024

(54) VENTILATION DEVICE EQUIPPED WITH A MEMBRANE FOR A VEHICLE LIQUID TANK

(71) Applicant: Plastic Omnium Advanced Innovation and Research, Brussels (BE)

(72) Inventors: Matthieu Leroy, Amiens (FR); Nicolas Derangere, Margny-les-Compiegne (FR); Cecile Fath, Compiegne (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 176 days.

(21) Appl. No.: 16/631,351

(22) PCT Filed: Jul. 18, 2018

(86) PCT No.: PCT/EP2018/069547
§ 371 (c)(1),
(2) Date: Jan. 15, 2020

(87) PCT Pub. No.: WO2019/020468
PCT Pub. Date: Jan. 31, 2019

(65) Prior Publication Data
US 2020/0215902 A1    Jul. 9, 2020

(30) Foreign Application Priority Data
Jul. 18, 2017   (FR) .................... 17 56818

(51) Int. Cl.
*B60K 15/035*  (2006.01)
*F01N 3/20*  (2006.01)
*B60K 15/03*  (2006.01)

(52) U.S. Cl.
CPC .......... *B60K 15/035* (2013.01); *F01N 3/2066* (2013.01); *B60K 2015/0346* (2013.01);
(Continued)

(58) Field of Classification Search
CPC .......... B60K 2015/0346; B60K 15/035; F01N 3/2066; Y10T 137/86324; Y10T 137/3084;
(Continued)

(56) References Cited

U.S. PATENT DOCUMENTS 1,564,120 A * 12/1925 Beckwith .................. B60S 9/12
                                                                    254/423
2,642,078 A *  6/1953 Woolley ................ F24D 19/087
                                                                    137/197
(Continued)

FOREIGN PATENT DOCUMENTS

CN    1171764 A   1/1998
CN    102678234 A   9/2012
(Continued)

OTHER PUBLICATIONS

International Search Report dated Nov. 16, 2018 in PCT/EP2018/069547 filed Jul. 18, 2018; 3 pages.

*Primary Examiner* — Logan M Kraft
*Assistant Examiner* — Joshua Campbell
(74) *Attorney, Agent, or Firm* — Oblon, McClelland, Maier & Neustadt, L.L.P.

(57) ABSTRACT

The ventilation device (4) for a vehicle liquid tank, comprises: a membrane (20) impermeable to a predetermined liquid and permeable to a vapor likely to be produced by this liquid, and at least one pipe (52) suitable for discharging liquid found on the membrane from the device. The or each pipe has an end contiguous with the membrane, the rest of the or each pipe extending at an altitude lower than this end when a main axis of the device is vertical.

18 Claims, 3 Drawing Sheets

Figure 1:
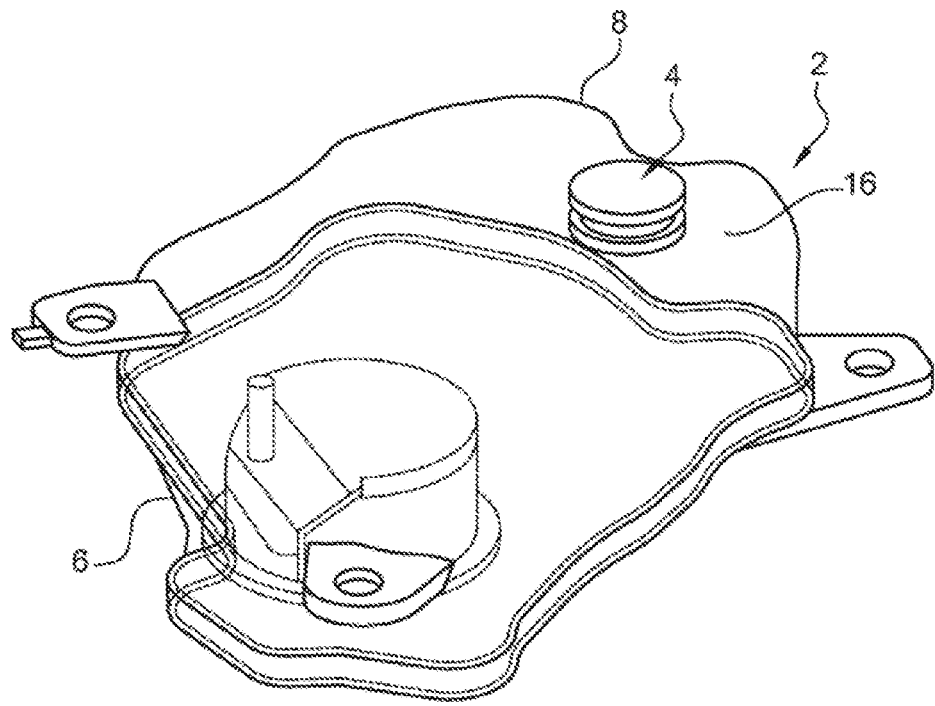

(52) U.S. Cl.
CPC .. *F01N 2610/02* (2013.01); *F01N 2610/1406* (2013.01); *F01N 2610/1466* (2013.01)

(58) Field of Classification Search
CPC .............. B65D 81/261; B65D 51/1611; B65D 51/1616; B65D 51/1622; B65D 51/1666; B65D 51/1694; H05K 5/0215; F16K 24/00
USPC ................................ 137/203, 197, 179, 201
See application file for complete search history.

(56) References Cited

U.S. PATENT DOCUMENTS

| | | | | |
|---|---|---|---|---|
| 2,672,878 A * | 3/1954 | Hencken | ............... | F24D 19/087 137/197 |
| 2,722,942 A * | 11/1955 | Hencken | ............... | F24D 19/087 251/117 |
| 2,723,676 A * | 11/1955 | Thrush | .................. | F24D 19/087 137/197 |
| 2,953,272 A * | 9/1960 | Mumford | ............. | B65D 41/185 215/320 |
| 3,827,564 A * | 8/1974 | Rak | ...................... | B01D 63/101 210/321.83 |
| 4,089,434 A * | 5/1978 | Tagalakis | ........... | B65D 51/1622 264/45.9 |
| 4,136,796 A * | 1/1979 | Dubois | .................. | B65D 51/1616 220/373 |
| 4,315,579 A * | 2/1982 | Martin, Jr. | ............. | B65D 90/34 220/374 |
| 4,790,445 A * | 12/1988 | Shibata | .............. | B65D 51/1616 220/374 |
| 4,909,408 A * | 3/1990 | Kos | .................... | B65D 51/1622 220/203.11 |
| 5,094,049 A * | 3/1992 | Sells | ........................ | E04D 13/17 52/302.1 |
| 5,579,936 A * | 12/1996 | Costa | ................. | B65D 51/1622 215/261 |
| 6,196,409 B1 * | 3/2001 | Lake | .................... | B65D 77/225 215/261 |
| 6,213,170 B1 * | 4/2001 | Burke | ............... | B60K 15/03504 141/50 |
| 7,491,258 B2 | 2/2009 | Gouzou et al. | | |
| 2004/0140308 A1 * | 7/2004 | Maenke | ................. | B65D 7/045 220/373 |
| 2009/0230078 A1 * | 9/2009 | Walsh | ................. | B65D 51/1616 215/261 |
| 2009/0250468 A1 * | 10/2009 | Whelan | ............ | B60K 15/03504 220/371 |
| 2010/0024898 A1 * | 2/2010 | Bansal | ............... | B01D 67/0088 137/197 |
| 2010/0079021 A1 * | 4/2010 | Lorin | ................... | H05K 5/0213 174/17.06 |
| 2010/0223917 A1 * | 9/2010 | Kolberg | ................ | F01N 3/2066 60/295 |
| 2010/0236640 A1 | 9/2010 | Erdmann | | |
| 2010/0264275 A1 * | 10/2010 | Behruzi | ................ | B64G 1/402 96/178 |
| 2011/0041594 A1 * | 2/2011 | Eslami | ............... | G01L 19/0636 73/114.43 |
| 2011/0056574 A1 * | 3/2011 | Welch | ................... | F16H 57/027 137/511 |
| 2012/0186677 A1 * | 7/2012 | Wetzel | .................... | F01N 3/208 137/624.27 |
| 2012/0305099 A1 | 12/2012 | Erdmann | | |
| 2015/0159529 A1 * | 6/2015 | Schroeder | ............. | B01D 69/02 96/4 |
| 2015/0330421 A1 * | 11/2015 | Kotowicz | ........... | H05K 5/0213 138/30 |
| 2016/0290520 A1 * | 10/2016 | Memmer | ......... | B60K 15/03519 |
| 2017/0304763 A1 * | 10/2017 | Nelson | ................ | B01D 46/543 |

FOREIGN PATENT DOCUMENTS

| | | | | |
|---|---|---|---|---|
| CN | 103459260 A | | 12/2013 | |
| EP | 0 588 907 B1 | | 3/1995 | |
| EP | 1 271 028 B1 | | 8/2005 | |
| EP | 2 106 950 A2 | | 10/2009 | |
| EP | 3 184 772 A1 | | 6/2017 | |
| EP | 3184772 B1 * | | 5/2019 | ............. F01N 13/18 |

* cited by examiner

VENTILATION DEVICE EQUIPPED WITH A MEMBRANE FOR A VEHICLE LIQUID TANK

The invention relates to vehicle liquid tanks and ventilation devices therefor. It relates to water tanks, fuel tanks and tanks for an ammonia precursor such as urea.

Irrespective of the contained liquid, the tank must comprise a ventilation device allowing the discharge of steam or air when the tank is experiencing an overpressure for example due to an increase in the temperature of the tank, an altitude increase or during a filling phase of the tank during which the gas present in the tank must quickly leave room for the liquid that is introduced therein. Such a device must also allow the introduction of gas into the tank for example when the tank experiences an underpressure under the effect of a reduction in its temperature, a drop in altitude or the consumption of the liquid of the tank by the vehicle.

Such a ventilation device must, to the extent possible, have the following advantages. It must be compact. It must protect the tank with respect to contamination by foreign elements to the tank. It may for example involve debris, dust or insects. It should not be sensitive to moisture. It must withstand freezing and thawing of the liquid contained in the tank. Lastly, it should protect the tank in case of ford crossing. This is the situation where the vehicle crosses a shallow waterway such that the level of the water reaches or exceeds that of the ventilation device of the tank. In such a situation, the water should not fill the tank through the ventilation device.

FIG. 1 of document WO2010/106421 for example teaches a ventilation device provided with a membrane impermeable to the liquid of the tank, but permeable to the vapors coming from this liquid and to the air. The cover of the tank of this embodiment provides the ventilation from the tank to the membrane, but water can be introduced into the latter in case of ford crossing. Yet once on the membrane, the water stagnates there, obstructs the membrane and limits ventilation, or even prevents it completely, which is detrimental to the working of the tank.

One aim of the invention is to address this drawback.

To that end, according to the invention, a ventilation device is provided for a vehicle liquid tank, which comprises:
- a membrane impermeable to a predetermined liquid and permeable to a vapor likely to be produced by this liquid, and
- at least one pipe suitable for discharging liquid found on the membrane from the device, the or each pipe having an end contiguous with the membrane, the rest of the or each pipe extending at an altitude lower than this end when a main axis of the device is vertical.

Thus, when water has managed to reach the membrane, in particular in case of ford crossing, the or each pipe immediately ensures the discharge thereof by gravity. In this way, the membrane remains free of any standing water and can perform its ventilation function normally. Furthermore, this device allows the balancing of overpressures and underpressures in the tank. It is compact. It protects the tank from contamination by elements foreign to the tank. It can for example involve debris, dust or insects. It is not sensitive to moisture. It withstands the freezing and thawing of the liquid contained in the tank.

A membrane is an element having a negligible thickness relative to its largest dimension. In the case of a circular membrane, the largest dimension of the membrane is its diameter. This characteristic is advantageous in particular in that it makes it possible to reduce the head loss of the device. It may be provided that the membrane has a thickness of between 250 and 350 µm. It may also be provided that the largest dimension of the membrane is between 10 and 100 mm, for example between 15 and 50 mm, preferably between 20 and 30 mm. The membrane can be made from any material whose properties allow it to be impermeable to a predetermined liquid and permeable to a vapor that may be produced by this liquid. Preferably, the membrane is made from polytetrafluoroethylene (PTFE). Advantageously, the membrane is oleophobic, hydrophobic and permeable to air. These properties are advantageous in that they participate in the barrier role of the membrane, for example against water and grime. For example, the membrane may comprise an oleophobic coating. It may be provided that the membrane is made from a material that can be welded to compounds made from a plastic material, such a material being PTFE, for example.

Preferably, the device is able to allow a gas communication between the outside of the device and an upper side of the membrane while limiting the intrusion from the outside of the device toward this side of the membrane of any foreign element to the device having a smallest total dimension above a predetermined threshold, in particular 2 mm.

Indeed, in particular for water tanks, it is necessary to equip the ventilation device with protection against the intrusion of foreign objects. These tanks are in fact very sensitive to bacterial development. The aforementioned size limitation further reduces the risk of intrusion by debris, insects and spiders into the membrane. Thus, the risk of the membrane being obstructed by foreign objects as well as the risk of bacterial development in the case of a water tank are reduced.

In one embodiment, the device comprises a main body and a cover able to be fastened to the body while allowing a gas communication between the outside of the device and an upper side of the membrane while limiting the intrusion from the outside of the device toward this side of the membrane of any element foreign to the device having a smallest total dimension above a predetermined threshold, in particular 2 mm.

This advantageously prevents the intrusion of foreign objects as explained above. It is for example possible to provide that the assembly of the cover and the main body arranges a radial space of predetermined size making it possible to limit the intrusion of foreign objects having a smallest total dimension greater than this predetermined size. In other words, radial play exists between the cover and the main body, the size of this play determining a threshold from which foreign objects cannot be introduced into the device, and more particularly, cannot reach the membrane. It may be provided that this radial play has the smallest possible size, that is to say, the smallest size compatible with the feasibility of the part and having a head loss below a head loss of the membrane itself.

Furthermore, the assembly of the cover on the main body forms a sinuous journey from the outside of the device to the membrane. This journey thus forms a labyrinth that reduces the risk of a foreign object reaching the membrane.

It may be provided that the cover has a circular rib complementary at least in part to a furrow present on the main body so as to guide the cover during the assembly of the latter on the main body of the ventilation device.

It may be provided that the device comprises two bearing zones making it possible to limit the movement of the membrane in case of underpressure or overpressure. These bearing zones aim to limit the stress in the membrane during pressure variations in the tank.

In one embodiment, the device comprises a main body and a cover able to be fastened to the body, wherein the membrane is fastened by a circumferential edge, so as to be watertight, to the body at an opening of the latter, this opening being formed by an inner flange, wherein the cover comprises a side wall provided with an inner face such that the inner face of the wall is facing an outer face of the inner flange while being separated from the latter by a distance smaller than a predetermined threshold, in particular 2 mm.

Such an arrangement allows a gas communication between the outside of the device and an upper side of the membrane while limiting the intrusion from the outside of the device toward this side of the membrane by any object foreign to the device having a smallest total dimension above a predetermined threshold, in particular 2 mm. It is possible to provide that the circumferential edge of the membrane and/or the opening of the body are circular. It is of course possible to provide that this edge and/or this opening have any other shape, for example oval, oblong or polygonal. It is possible to provide that the inner flange and/or the side wall are cylindrical. It is of course possible to provide that this inner collar and/or this side wall have any other shape, for example frustoconical.

For example, the cover is welded to the body.

Advantageously, the tank comprises an open-worked wall extending at a distance from the membrane, facing a lower wall of the membrane.

This open-worked wall ensures gas communication between the inside of the tank and the membrane while protecting the latter with respect to masses that may collide with the membrane and damage it. These may be liquid masses such as blocks of ice or ammonia precursor solution having solidified under the effect of a freeze. On this subject, it will be recalled that water freezes at 0'C and an eutectic urea solution commonly used to generate ammonia freezes at about −13° C., which are temperatures to which a vehicle may be exposed. It will be recalled that ammonia can be used in the exhaust circuit of the heat engine of the vehicle to reduce nitrogen oxides and thus to clean up the exhaust gases. Preferably, the distance between the membrane and the open-worked wall is as large as possible, for example the distance between the membrane and the open-worked wall is equal to the distance between the membrane and the wall of the liquid tank on which the ventilation device is mounted. The greater the distance is between the membrane and the open-worked wall, the less risk there is of a block of ice colliding with the membrane and damaging it.

The open-worked wall comprises at least one opening. It is possible to provide that the open-worked wall comprises between one and ten openings, for example between three and six openings. The opening(s) can for example have a circular shape. It is possible to provide that the opening(s) are dimensioned to be insensitive to the crystallization of the liquid contained in the tank in contact with the air. More specifically, it is possible to provide that the opening(s) are dimensioned to be insensitive to the crystallization of the urea in contact with the air. Thus, a risk of obstruction of the opening(s) that would prevent the proper working of the device is avoided.

Advantageously, the tank comprises a base having a largest transverse dimension greater than a largest transverse dimension of the body.

Thus, it is possible to bear on the base during the fastening of the device to the tank. The width of the base is in particular chosen as a function of the injection allowances of the tank, the dimension of a ventilation hole in the wall of the tank on which the ventilation device is installed and/or the welding precision of the machine used to manufacture the device or for its assembly on the tank. The smaller the width of the base is, the more compact the device is.

Advantageously, the body comprises at least two external inclined faces oriented toward the base.

These two faces serve as a bearing point to grasp the device during its fastening to a tank.

Advantageously, at least one outer face of the device has a screwing thread. This screwing thread for example allows the locking of a welding tool during the assembly of the device on the tank.

Also provided according to the invention is a tank that comprises a device according to the invention.

Also provided according to the invention is a liquid tank for a vehicle, which comprises:
- a membrane impermeable to the liquid and permeable to a vapor likely to be produced by this liquid, and
- at least one pipe suitable for discharging liquid found on the membrane from the tank, the or each pipe having an end contiguous with the membrane, the rest of the or each pipe extending at an altitude lower than this end when a main axis of the tank is vertical.

Advantageously, the tank comprises an open-worked wall extending at a distance from the membrane, facing a side of the membrane oriented toward the inside of the tank.

The tank according to the invention can form a water tank, a fuel tank or a tank for an ammonia precursor such as urea.

Lastly, the invention provides a vehicle that comprises a device according to the invention or a tank according to the invention.

Figure 2:
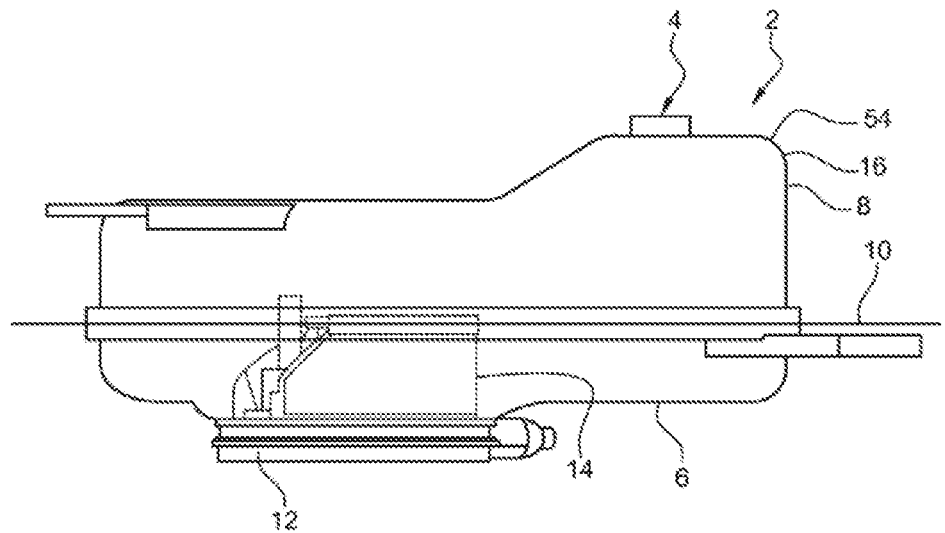
Figure 3:
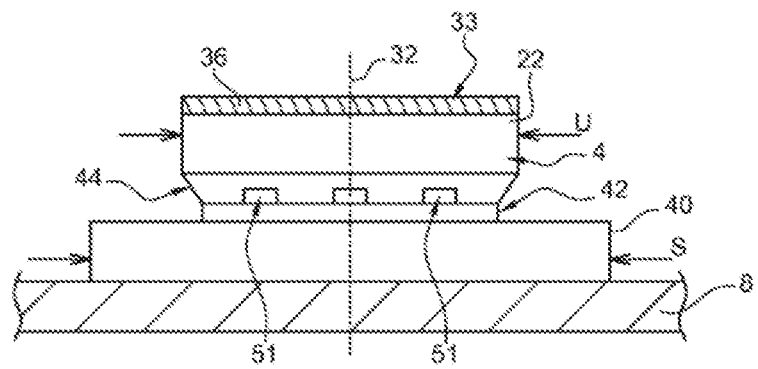
Figure 4:
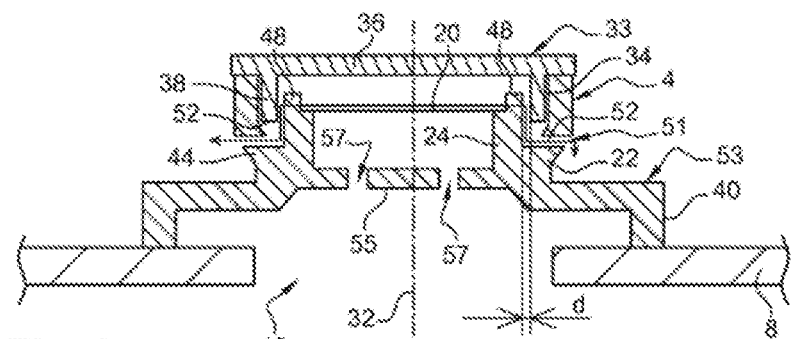
Figure 5:
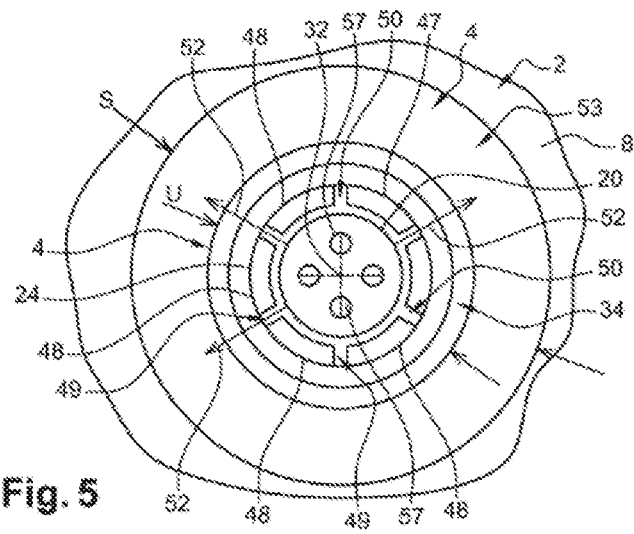
Figure 6:
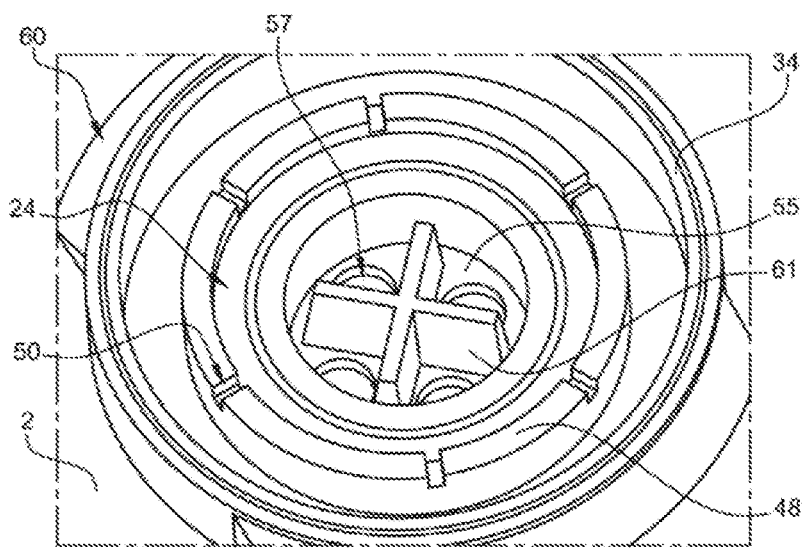
Figure 7:
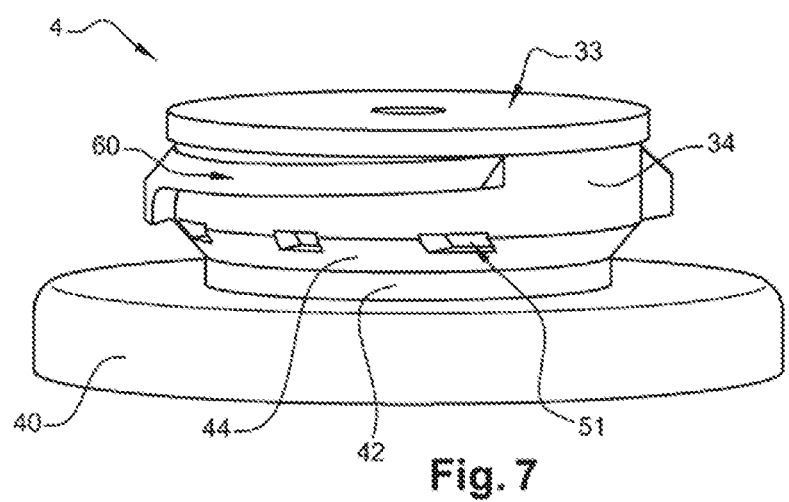

We will now describe two embodiments of the invention given as non-limiting examples and supported by the appended figures, in which:

FIGS. 1 and 2 are perspective and elevation views of a tank according to a first embodiment of the invention, FIGS. 3 to 5 are elevation views, in vertical axial cross-section and top view, of the ventilation device of the tank of the preceding figures, FIG. 6 is a perspective view of the ventilation device according to a second embodiment, in which the cover and the membrane are not shown, and FIG. 7 is a perspective view of the device of FIG. 6.

In reference to FIGS. 1 to 5, we will describe a vehicle tank 2 provided with a ventilation device 4 according to a first embodiment of the invention. It is a fuel tank such as diesel fuel, in the present example.

The tank 2 here is formed by two lower 6 and upper 8 shells made from thermoplastic material. The two shells will be welded to one another at a weld plane 10 extending in a median zone of the height of the tank.

In the lower part, the tank comprises a platen 12 closing a lower opening of the lower shell 6 and bearing different members gathered to form a module 14 extending in the tank. These members in particular comprise a pump for injecting liquid from the tank outside the latter for use thereof on board a vehicle. Such a module is known in itself and will not be described in more detail here.

The ventilation device 4 is located in the uppermost point of the tank or one of its highest points. Here, this point forms an upper recess 16. The device is arranged on an opening 18 of the upper shell 8, this opening being provided in one of the main walls of the tank.

The device 4 comprises a ventilation member comprising a membrane 20 that is impermeable to water and permeable to diesel vapor, steam and air. This membrane here is microporous and for example made from polytetrafluoroethylene (PTFE). The membrane 20 has a thickness of between 250 and 350 µm. The membrane 20 is for example made in a planar form, such as a disc. It extends horizontally and is fastened by its circumferential circular edge so as to be watertight to a support 22 of the ventilation device at a circular opening of this support, here formed by an inner cylindrical flange 24.

The device further comprises a cover 33 able to be fastened to the support 22:
  while preserving a gas passage through the membrane 20 toward the outside of the device along the cover, and
  while limiting the intrusion into the device of any element foreign to the device having a smallest total dimension above a predetermined threshold, in particular 2 mm, or even 1.5 mm. To that end, in the present example, the cover comprises a disc-shaped upper wall 36 and a cylindrical side wall 38.

The base 22 comprises an outer cylindrical flange 34 extending around the inner flange 24 and at a distance from the latter in reference to a main axis 32 of the device. This axis is oriented vertically during the use of the device and the tank embedded in the vehicle. The outer flange 34 also extends higher than the inner flange 24. The cylindrical wall 38 of the support is fastened to its upper wall 36 at a distance from the peripheral edge of the latter. In this way, the peripheral edge zone of the wall 36 is left free and serves to fasten the cover directly on the outer cylindrical flange 34, in the case at hand by ultrasonic welding. This welding produces a continuous junction along the entire inner edge over a closed loop.

The cylindrical wall 38 of the cover therefore, by its outer face, is facing the inner face of the outer flange 34. Additionally, the inner face of the wall 38 is facing the outer face of the inner flange 24 while being separated by the latter by a distance d smaller than 2 mm, preferably than 1.5 mm. This distance is illustrated in FIG. 4. It procures the aforementioned anti-intrusion effect.

The inner flange 24 is topped in the present example by curved indentations 48 arranged in a circular configuration in planar view like in FIG. 5; here, there are six of them. The apex of the indentations 48 is facing and at a distance from the inner face of the upper wall 36 of the cover. The indentations 48 are arranged at a distance from one another such that their side edges 49 extend facing and at a distance from one another. This distance arranges respective spaces 50 between the indentations 48 that place the membrane 20 in communication with the outside of the flange 24. In this way, each of the spaces 50 is part of a pipe 52 whose upstream end is contiguous with the circumferential circular edge of the membrane 20 at the apex of the flange. The terms "upstream" and "downstream" here refer to the flow of water from the membrane toward the outside of the device. In the downstream direction, each pipe 52 continues while being formed by the space 50, then descends between the outer face of the flange 24 and the inner face of the cylindrical wall 38 of the cover. Lastly, orifices 51 are arranged in the frustoconical wall 44. These orifices are in respective communication with the spaces 50 and/or in the same angular position as those around the axis 32. These orifices form the downstream end of the pipes. The presence of these multiple orifices makes it possible to reduce the risk of obstruction of the device. It is observed that the upstream end of each pipe contiguous to the membrane 20 forms the uppermost point of the pipe when the axis 32 is vertical, that is to say, when the device and the tank are in their normal usage position. The downstream end of the pipe, formed by the orifice 51, constitutes the lowermost point thereof. Furthermore, the fact that these orifices are distributed angularly around the axis 32 allows a good discharge of any liquids potentially present on the membrane and therefore limits the accumulation thereof on the membrane, thus making it possible to preserve the ventilation function thereof, for example during ford crossing.

The support 22 comprises a planar horizontal lower wall 55 perpendicular to the axis 32, extending below the membrane 20, opposite and at a distance therefrom. The wall has orifices or apertures 57 (see FIGS. 4 and 5), These orifices 57 make it possible to discharge the water that could be located above the wall so that it falls back into the reservoir. They also place the membrane 20 in gas communication with the inside of the tank. This wall also provides protection of the membrane with respect to masses of liquid or blocks of frozen liquid that could damage the membrane.

The ventilation device further comprises a base 40. The support 22 is rigidly fastened to the upper wall of the base 40. The part of the support 22 that is contiguous to the base 40 forms a cylindrical face 42 with a diameter smaller than that U of the outer cylindrical face of the flange 34. The junction between these two faces is formed by a frustoconical face 44. This narrowing of the support toward the base therefore offers inclined faces that facilitate the gripping of the support by a tool during the fastening of the device to the tank.

The support 22 and the base 40 are made from thermoplastic material. The base is fastened, for example by welding, to the main wall of the tank forming the upper shell 8 facing the opening 18. In the present example, the upper face of the base bears against an outer face of the main wall. The opening 18 is thus in gas communication with the membrane 20. Lastly, the membrane is in gas communication with the outside of the tank along the cover 36. One can see that the device 4 is able to be attached on a tank 2 in order to ventilate it. The membrane is in fact able to place the inside of the tank in gas communication with the outside of the tank.

The tank also comprises a filling tube 54.

The base, the cover and the support are for example made from polyethylene, other thermoplastic materials nevertheless being conceivable.

The device works as follows.

When the tank experiences an overpressure due to an increase in the temperature or altitude, since this increase generally occurs slowly, the steam or fuel vapor can pass slowly through the opening 18 of the tank, through the openings 57 until reaching the membrane 20 and passing through it. These gases pass above the flange and below the wall 36 of the cover, then between the flange and the side wall 38, then escape through the orifices 51 into the atmosphere.

When the tank experiences an underpressure due to a drop in the temperature or the altitude, the same phenomenon occurs in reverse, except that this time it is ambient air that penetrates below the cover 36 through the membrane 20 until reaching the inside of the tank to reestablish a normal pressure therein.

The membrane also procures effective protection against the intrusion of foreign elements. Additional protection is procured by the cooperation between the cover 33 and the support 22 for the elements having a smallest total dimension of less than 2 mm. Indeed, a debris and particularly insects or spiders for the most part cannot penetrate through the orifices 51, much less between the flange 24 and the side wall 38 of the cover in light of the distance d. In this context, the inner flange 24 and the cover 33 form a labyrinth that is more effective because it is sinuous. If the water arrives on the membrane 20 for example on the occasion of a ford crossing, this water is immediately discharged by gravity through the drainage pipes 52, by first crossing the drainage spaces 50 and lastly the drainage orifices 51.

The ventilation device can be attached on the tank once the latter is made or integrated into the tank during the manufacture, in particular by injection or by blowing, of the latter. In this respect, the frustoconical wall 44 offers an engagement for a tool allowing holding of the support 22 during the placement and fastening of the device on a tank. Additionally, the upper face 53 of the base, left free by the support, allows a tool to bear for this fastening, which for example takes place by hot welding of the plastic material of the base on that of the tank. This disengagement results from the fact that the largest transverse dimension U, which corresponds to the largest diameter of the support 22, is smaller than the largest diameter S of the base 40.

One can see that the device is compact.

Below, several examples are described of sizings for producing the invention, non-limitingly, with the understanding that other sizings can be considered.

In the Case of a Water Tank

For a water tank, it is possible to give the membrane 20 a diameter of 30 mm. It will allow to procure a head loss of 50 mbar (50 hPa or 5000 Pa) in the tank with a gas flow rate of 80 liters per hour. Indeed, during operation, the pump of the tank will apply a flow rate of 80 liters per hour, and it is not desirable for the underpressure in the tank to exceed 50 mbar.

In the Case of a Tank for a Urea Solution

For a tank of a urea solution, it is possible to give the membrane 20 a diameter of 20 mm. It will allow to procure a head loss of 45 mbar (4500 Pa) in the tank with a gas flow rate of 15 liters per hour.

In the Case of a Fuel Tank Such as Diesel Fuel

For a fuel tank such as diesel fuel, it is possible to give the membrane 20 a diameter of 30 mm. It will allow to procure a head loss of 45 mbar (4500 Pa) in the tank with a gas flow rate of 30 liters per hour.

The invention is not limited to the described embodiment.

The cover can also be fastened to the support by clipping.

The second embodiment, shown in FIGS. 6 and 7, is identical to the first embodiment except for the following points:
- a journal cross 61 extends from the open-worked wall 55 toward the membrane 20 (see FIG. 6). The journal cross 61 delimits four compartments that each comprise one of the orifices 57 of the open-worked wall 55. This journal cross 61 makes it possible, inter alia, to reinforce the open-worked wall 55, and
- the outer flange 34 has an inner face and an outer face in reference to the main axis 32 of the device. A screwing thread 60 is present on the outer face of the outer flange 34 (see FIGS. 6 and 7). This screwing thread 60 in particular allows the screwing of a welding tool during the method for assembling the device 4 on the tank 2.

The invention claimed is:

1. A ventilation device for a vehicle liquid tank, comprising:
   - a base configured to be fastened to a main wall of the tank,
   - a membrane impermeable to a predetermined liquid and permeable to a vapor likely to be produced by the liquid,
   - a support on which the membrane is fastened, the support including an inner cylindrical flange forming an opening on which the membrane is fastened, and an outer cylindrical flange extending around and at a distance fro the timer cylindrical flange, and the support being rigidly fastened to an upper wall of the base,
   - a cover including an upper wall and a cylindrical side wall, the cylindrical side wall of the cover extending around and at a distance from the inner cylindrical flange of the support, an outer face of the side wall of the cover being fastened to an inner face of the outer cylindrical flange of the support, and an inner face of the side wall of the cover facing and being spaced apart from an outer face of the inner cylindrical flange of the support, and
   - at least three pipes suitable for discharging liquid found on an upper side of the membrane from the device, each pipe having an upstream end contiguous with the membrane and extending radially from the membrane, the rest of each pipe extending at an altitude lower than the upstream end when a main axis of the device is vertical, a portion of each pipe descending between the outer face of the inner cylindrical flange and the inner face of the side wall of the cover,
   - wherein a downstream end of each pipe is formed by au orifice provided in a wall formed at a junction between the support and the base, each orifice forming a through-hole through the wall formed at the junction between the support and the base, the orifices being evenly distributed angularly around the main axis of the device.

2. The device according to claim 1, configured to allow a gas communication between the outside of the device and an upper side of the membrane while limiting the intrusion from the outside of the device toward the upper side of the membrane of any element foreign to the device having a smallest total dimension above a predetermined threshold.

3. The device according to claim 1, wherein the cover is fastened to the support by welding.

4. The device according to claim 1, wherein said device comprises au open-worked wall extending at a distance from the membrane, facing a lower wall of the membrane.

5. The device according to claim 1, wherein a largest transverse dimension of the base is greater than a largest transverse dimension of the support.

6. The device according to claim 5, wherein the support comprises two external inclined faces oriented toward the base.

7. A tank that comprises a device according to claim 1.

8. A vehicle that comprises a tank according to claim 7.

9. The tank according to claim 7, wherein said tank is a water tank.

10. The tank according to claim 7, wherein said tank is a fuel tank.

11. The tank according to claim 7, wherein said tank is an ammonia precursor tank.

12. A vehicle that comprises a device according to claim 1.

13. The device according to claim 1, wherein the wall formed at the junction between the support and the base is frustoconical.

14. The device according to claim 1, wherein the inner cylindrical flange of the support is topped by curved indentations.

15. A liquid tank for a vehicle, comprising:
   - a base fastened to a main wall of the tank, a membrane impermeable to the liquid and permeable to a vapor likely to be produced by the liquid, a support on which the membrane is fastened, the support including an inner cylindrical flange forming an opening on which the membrane is fastened, and an outer cylindrical flange extending around and at a distance from the inner cylindrical flange, and the support being rigidly fastened to an upper wall of the base, a cover including an upper wall and a cylindrical side wall, the cylindrical side wall of the cover extending around and at a distance from the inner cylindrical flange of the support, an outer face of the side wall of the cover being fastened to an inner face of outer cylindrical flange of the support, and an inner face of the side wall of the cover facing and being spaced apart from an outer face of the inner cylindrical flange of the support, and at least three pipes suitable for discharging liquid found on an upper side of the membrane from the tank, each pipe having an upstream end contiguous with the membrane and extending radially from the membrane, the rest of each pipe extending at an altitude lower than the upstream end when a main axis of the tank is vertical, a portion of each pipe descending between the outer face of the inner cylindrical flange and the inner face of the side wall of the cover, wherein a downstream end of each pipe is formed by an orifice provided in a wall formed at a junction between the support and the base, each orifice forming a through-hole through the wall formed at the junction between the support and the base, the orifices being evenly distributed angularly around the main axis of the tank.

16. The tank according to claim 15, further comprising au open-worked wall extending at a distance from the membrane, facing a side of the membrane oriented toward the inside of the tank.

17. The tank according to claim 15, wherein the wall formed at the junction between the support and the base is frustoconical.

18. The tank according to claim 15, wherein the inner cylindrical flange of the support is topped by curved indentations.

* * * * *